June 13, 1961 A. W. LOVE ET AL 2,988,690
METHOD AND APPARATUS FOR GEOPHYSICAL EXPLORATION
Filed Aug. 17, 1956 4 Sheets-Sheet 1

ALLAN WALTER LOVE
ROBERT WILKES BALDWIN
ARTHUR ALBERT BRANT
INVENTORS

BY Rudolph J. Junick
ATTORNEY

Fig-2B

United States Patent Office 2,988,690
Patented June 13, 1961

2,988,690
METHOD AND APPARATUS FOR GEOPHYSICAL EXPLORATION
Allan Walter Love, Clarkdale, Robert Wilkes Baldwin, Jerome, and Arthur Albert Brant, Clarkdale, Ariz., assignors to Newmont Mining Corporation, New York, N.Y., a corporation of Delaware
Filed Aug. 17, 1956, Ser. No. 604,734
11 Claims. (Cl. 324—1)

This invention relates to geophysical exploration and more particularly to a novel method and apparatus for detecting the presence of subsurface metallic particles in an otherwise barren rock.

Metallic particles generally are found in nature in the form of sulphides and it is known that rock formations lying below the water table are fairly well saturated with moisture. Consequently, there may be present, under the ground surface, a medium consisting of a conducting solution of water and soluble metallic salts. These conditions have given rise to various methods for the detection of mineral deposits. Often, a time-varying current is caused to flow through a selected region of ground and resultant voltages are observed across a pair of pick-up electrodes inserted into the ground surface. The character of these resultant voltages is taken as an indication of the specific subsurface conditions.

All electrical methods of geophysical exploration involve a critical interpretation of the observed data in order to arrive at a conclusion with respect to the nature of the specific subsurface conditions under investigation. The extent to which interfering and non-related phenomena may be excluded or discounted from the observed data, and the extent to which the subsurface mineralization responds to the charging current, establishes the useful scope of the particular process. The novel method and apparatus of our invention for determining the subsurface presence of metallic sulphides is particularly useful in detecting and locating subsurface mineralization.

For a proper understanding of the invention and the principles involved therein, reference will be made to two prior art methods of geophysical prospecting. One method involves the use of direct-current and is described in Patent No. 2,611,004 to A. A. Brant et al. which issued September 16, 1952. In that patent a method of prospecting is described in which the "overvoltage" effect is utilized to indicate the presence of subsurface mineralization. In short, the system of prospecting comprises passing a D.-C. current through the region under investigation. If metallic sulphide particles (galena, chalcopyrite, pyrite, etc.) are present in a rock medium containing an electrolyte, a double layer charge effect develops on the metallic sulphide particle surfaces. The double layer charge effects are such that the positive charge of the double layer is nearer the positive earth current electrode and the negative charge of the double layer is nearer the negative earth current electrode. Thus, these double layer charge effects hinder, or offer an impedance to the normal flow of current through the medium, which results in the phenomenon known as the overvoltage effect. Pick-up stakes in the vicinity of the D.-C. charging current are used to pick-up the voltage which results from the overvoltage effect when the D.-C. charging potential is cut off.

It has since been discovered that the same overvoltage effects may be utilized in an A.-C. method of prospecting providing the frequency of the A.-C. charging current is kept very low. In patent application Serial Number 273,422, filed February 26, 1952, now Patent No. 2,766,421, by James A. Wait et al., such a low frequency A.-C. method of prospecting has been described. When a low frequency charging current, between 0.1 and 100 cycles per second, for example, is applied to the charging current electrodes, one current electrode remains positive for a significant period of time and during this time the double layer (overvoltage) effects will build up on the metallic sulphide particles and will offer an apparent impedance to the flow of current in the rock medium. Thus, an aggregate of scattered metallic sulphide particles in a rock medium, at low frequencies, will develop double layer charge effects that act just like small capacitors and create a voltage drop out of phase with the primary, low frequency current. In the present specification, a novel method of prospecting will be described wherein the phase angle between the charging current and the voltage picked up at a pair of pick-up electrodes (which phase relation results from the overvoltage effects) is measured.

It is further known that the effective conductivity of rock materials is not in general constant but is in general complex when a variable sinusoidal source of energizing current is used. This effective conductivity will hereinafter be referred to as the apparent conductivity of the medium under consideration. The apparent conductivity is a complex quantity made up of a real and an imaginary component which components are in quadrature relation. For very low frequencies, overvoltage is related to the apparent conductivity at two different frequencies 1 and 2, by the relation:

$$\text{Overvoltage} = \frac{\sigma_{i2} - \sigma_{i1}}{\sigma_{i2}}$$

where frequency 2 is greater than frequency 1 and $\sigma_i$ is the apparent complex conductivity. In the present application a novel method of prospecting will be described wherein the apparent complex conductivity at different frequencies is measured and utilized as a diagnostic factor in the determination of the presence of mineralization.

The phase angle and the apparent complex conductivity, both of which are effected by the presence of mineralization when a low frequency A.-C. charging current is applied to the ground, are related in that the phase angle is proportional to the slope of the apparent complex conductivity curve plotted against the logarithm of frequency. This relationship will become apparent upon examination of typical curves of the above mentioned variables plotted against the logarithm of frequency which will be described below.

An object of this invention is the provision of a novel method and apparatus for the detection of scattered metallic sulphide.

An object of this invention is the provision of a method for detecting the presence of subsurface metallic sulphides by ascertaining the phase angle between the charging current and the voltage at a pair of pick up electrodes and/or the apparent complex conductivity of the underground medium in terms of the frequency of the sinusoidal charging current caused to flow through the medium.

An object of this invention is the provision of a method of geophysical exploration comprising impressing an A.-C. charging current through a selected region of the ground, observing the resulting voltage between a pair of pick-up electrodes inserted into the ground, altering the frequency of the charging current, and establishing the character of the subsurface medium by the variations of the resulting voltages with the frequency of the charging current.

An object of this invention is the provision of a method of establishing the degree of mineralization of a selected region of earth which method comprises impressing a sinusoidal charging current through the said region, adjusting the magnitude of the said charging current such that the resultant voltage across a pair of spaced pick-up electrodes positioned within the field of influence of the charging current is adjusted to a predetermined value, changing the frequency of the said charging current, and readjusting the magnitude of the said charging current such that the voltage across the said pick-up electrodes is at the said predetermined value, the degree of mineralization of the said selected region of earth being determined by the change in the amount of charging current with a change of the said frequency.

An object of this invention is the provision of a method of determining the degree of mineralization of a selected region of earth which method comprises impressing a sinusoidal charging current through the said region and a resistor, and measuring the phase angle between the resultant voltage across a pair of spaced pick-up electrodes positioned within the field of influence of the charging current and the voltage appearing across the said resistor, the degree of mineralization of the said selected region of earth being determined by the phase angle between the two said voltages.

An object of this invention is the provision of a method of establishing the degree of mineralization of a selected region of earth which method comprises impressing a sinusoidal charging current through the said region and the rotor of a two phase syncro, applying the voltage appearing across the series connected syncro stators to a series connected resistor and capacitor, applying the voltage appearing between the junction between the syncro stators and the junction between the capacitor and resistor to a potentiometer, applying a portion of the voltage appearing across the potentiometer to a first differential amplifier, applying the resultant voltage across a pair of pick-up electrodes to a second differential amplifier, and adjusting the position of the syncro rotor and potentiometer movable arm to establish an exact balance between the differential amplifier outputs, the degree of mineralization of the said region of earth being determined by the position of the syncro rotor and the position of the movable arm of the potentiometer relative to their respective reference positions.

An object of this invention is the provision of an instrument scale device comprising a fixed scale plate and first and second movable scale plates, each of the said scale plates being provided with similar scales having uniformly spaced interval markings, a pointer mounted for pivotal movement about a pointer axis, the said first and second movable scale plates being adapted for pivotal movement about an axis along the pointer axis extended, and means locking the said first and second movable scale plates together.

These and other objects and advantages will become apparent from the following description when taken with the accompanying drawings. The drawings are for purposes of illustration and are not to be construed as defining the scope or limits of the invention, reference being had for the latter purposes to the appended claims.

In the drawings wherein like reference characters denote like parts in the several views.

Figure 1:
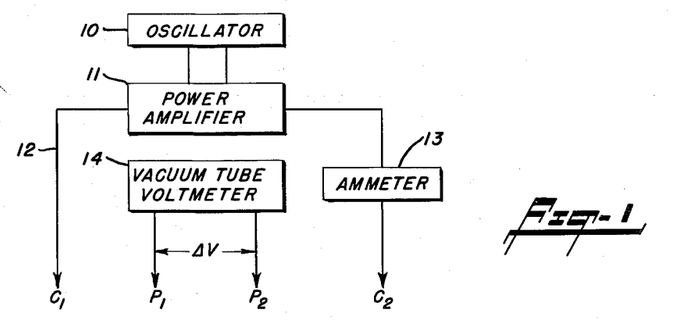
FIGURE 1 is a diagrammatic representation of an apparatus for use in making apparent complex conductivity measurements of a subsurface medium.

Reference is now made to FIGURE 1 of the drawings wherein means and apparatus for measuring the apparent complex conductivity of a subsurface medium is shown. An alternating current source comprises an oscillator 10 which is adjustable in frequency in a range from 0.1 to 100 cycles per second, preferably. In practice, an oscillator which may be set at three or more frequencies within the range of 0.1 to 100 cycles per second has been found to be adequate. The magnitude of the oscillator output is continuously adjustable between two fixed values of oscillator output. The output from the oscillator is amplified by a conventional direct-coupled power amplifier 11. The output from the direct-coupled power amplifier is fed directly to one charging electrode $C_1$ over the cable 12 and to the other charging electrode $C_2$ through an ammeter 13. The charging electrodes $C_1$ and $C_2$ along with the two pick-up electrodes $P_1$ and $P_2$, all of which are inserted into the ground, comprise a four electrode system.

When an alternating charging current flows through the ground, the resulting voltages appearing on the surface of the earth are measured by a voltmeter 14 which is connected to the pick-up electrodes $P_1$ and $P_2$. In the case of the apparatus of FIGURE 1, or any apparatus which is shown in subsequent drawings, the specific configuration of the electrode array is immaterial to the practice of our invention. Any configuration of two charging and two pick-up electrodes may be used.

An explanation of the apparatus of FIGURE 1, and the effect of the geometric configuration of the four electrode array follows. The sinusoidal charging current into the ground through the charging electrodes $C_1$ and $C_2$ may be expressed by:

$$I_\omega = \Delta V \sigma_{i\omega} K$$

wherein;

$I_\omega$ is the current into the ground at a frequency of $$\frac{\omega}{2\pi}$$

$\Delta V$ is the voltage drop between the potential stakes $P_1$ and $P_2$, $\sigma_{i\omega}$ is the apparent complex conductivity of the earth (the subscript "$i$" indicating that the conductivity is, in general, complex), and $K$ is a geometric factor which is dependent upon the electrodal disposition.

Once the arrangement and distance between the electrodes is decided upon, the geometric factor $K$ may be readily calculated. (The geometry of the electrodes will, of course, determine what portion of the earth is being measured for apparent complex conductivity.)

As mentioned above, the frequency of oscillation may be varied between the range of 0.1 to 100 cycles per second, preferably. If for each of the various frequencies, we adjust the current $I_\omega$ so that $\Delta V$ is a constant, we then have:

$$I_\omega = \sigma_{i\omega} C$$

wherein;

C is a constant equal to $\Delta VK$.

A suitable constant C is chosen for $\Delta VK$ and the voltmeter 14 is calibrated directly in electrode spacing (in feet or meters) with different voltmeter scales for different electrode arrangements. When the voltmeter 14 indicates the electrode arrangement and spacing in use, the condition obtains wherein $C=\Delta VK$. The charging current $I_\omega$ flows through the ammeter 13 and therefore, from the relation $I_\omega = \sigma_{i\omega} C$, it is seen that the ammeter 13 may be calibrated directly in units of apparent complex conductivity (mhos per meter) by use of the conversion factor $$\sigma_{i\omega} = I_\omega \times \frac{1}{C}$$

The operational procedure in determining the apparent complex conductivity $\sigma_{i\omega}$ is extremely simple with the apparatus of FIGURE 1. The magnitude of the output of the oscillator 10 is adjusted until the vacuum tube voltmeter 14 indicates the electrode arrangement and spacing in use and the apparent complex conductivity is then read directly on the ammeter 13.

Many factors determine the apparent complex conductivity of a region of earth and so the absolute value of the apparent complex conductivity as measured on the ammeter 13 is not always indicative of mineralization. Because of the overvoltage effects, however, the apparent complex conductivity changes with frequency. The change in the apparent complex conductivity with frequency is diagnostic of mineralization. Therefore, in order to obtain useful information for prospecting, it is necessary to measure the apparent complex conductivity for at least two different frequencies (preferably within the range of 0.1 to 100 cycles per second), and to note the difference in the apparent complex conductivity at the different frequencies.

Figure 2A:
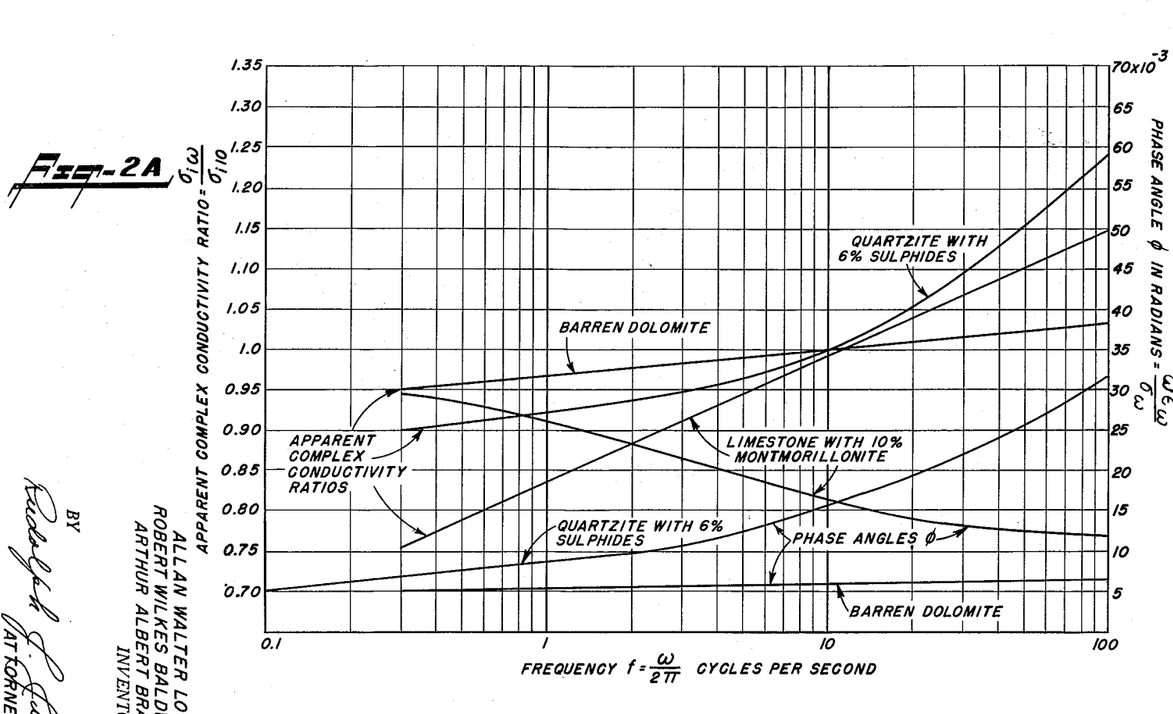
FIGURES 2a and 2b are sets of curves illustrating the variation of the apparent complex conductivity and the out-of-phase conductivity of a subsurface medium, and the phase angle between the charging current and pick-up voltage, as a function of the frequency of a sinusoidal current flowing through the medium.
Figure 2B:
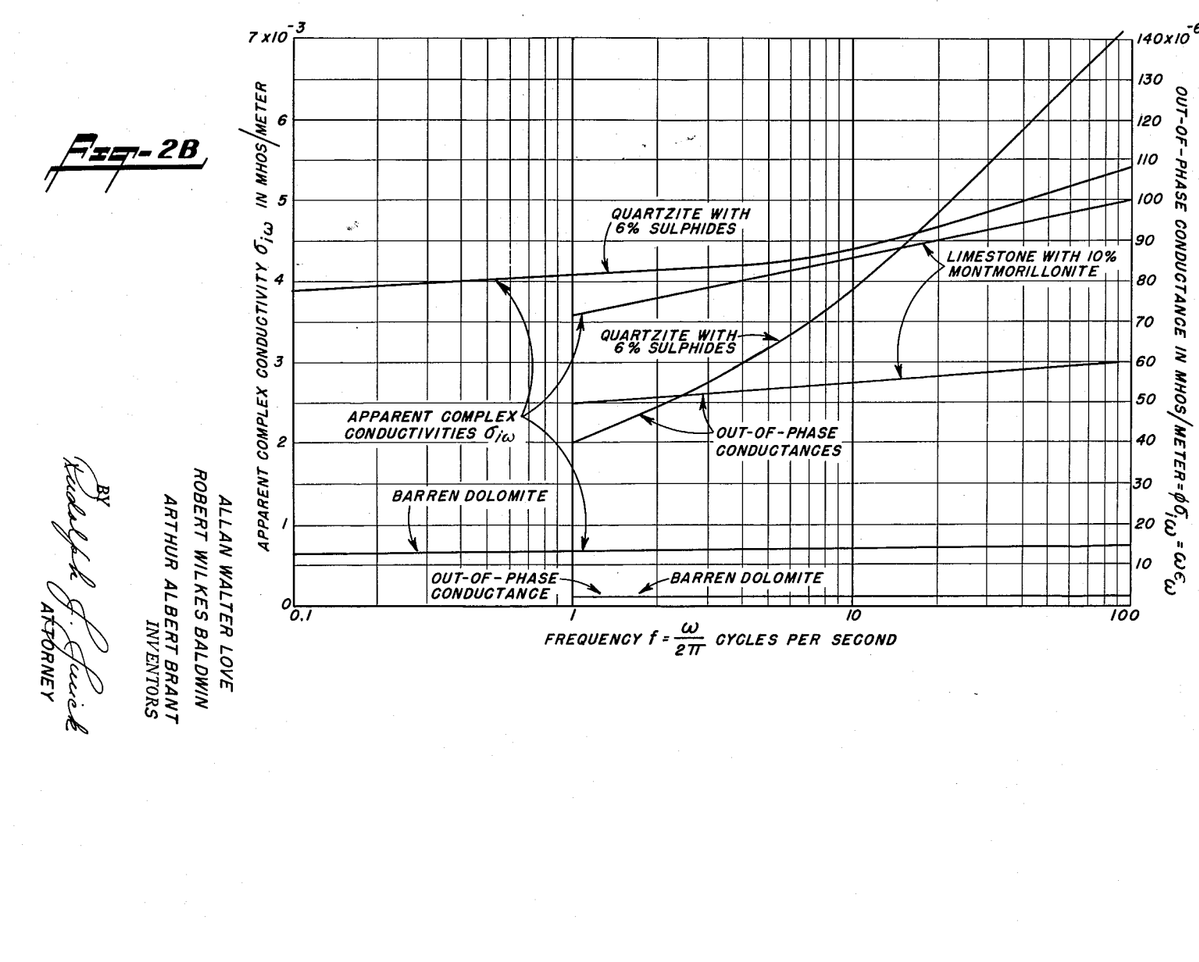

For earth containing mineralization, the slope of the apparent complex conductivity curve versus frequency, within the low frequency ranges, is relatively steep; while the apparent complex conductivity versus frequency curve for earths containing no mineralization has almost no slope (see FIGURE 2b). It has been found, however, that certain regions of earth, though barren of mineralization, can exhibit an apparent complex conductivity versus frequency curve which has a steep slope. A subsurface medium which contains no metallic sulphides but which does contain a montmorillonite type crystal lattice (e.g. biotite-muscovite montmorillonite) will exhibit a steeply sloping apparent complex conductivity versus frequency curve. It is seen then, that measuring the apparent complex conductivity at two different frequencies and noting a change therein at the two frequencies does not necessarily indicate the presence of mineralization. It has been found that earth which is barren of mineralization but which contains a montmorillonite type crystal exhibits a steeply sloping but almost straight line apparent complex conductivity versus frequency curve while the earth's containing metallic sulphides result in an apparent complex conductivity versus frequency curve which is relatively steeply sloping and which is not a straight line but which has a definite curvature thereto. Hence, montmorillonite with charged basal lattice surfaces may be distinguished from metallic sulphide deposits by observing a change in slope of the apparent complex conductivity versus frequency curve (wherein frequency is plotted on a logarithmic scale and apparent complex conductivity on a linear scale).

Any change in the slope of the curve may be easily detected with the apparatus of our invention as illustrated in FIGURE 1, by measuring the apparent complex conductivity at three frequencies, for example, and comparing the change in the apparent complex conductivity between these frequencies. Where three frequencies $f_1$, $f_2$, and $f_3$, are such that they form two equal logarithmic intervals, the difference of the apparent complex conductivity between one frequency change from that in an adjoining frequency change may be expressed:

$$[(\sigma_{i\omega 3} - \sigma_{i\omega 2}) - (\sigma_{i\omega 2} - \sigma_{i\omega 1})]$$

If $(\sigma_{i\omega 3} - \sigma_{i\omega 2})$ equals $(\sigma_{i\omega 2} - \sigma_{i\omega 1})$ there is no curvature of the apparent complex conductivity versus frequency curve and this would indicate an area containing no metallic sulphides but probably containing montmorillonite type crystals; if the slope of the curve is steep. If the quantities $(\sigma_{i\omega 3} - \sigma_{i\omega 2})$ and $(\sigma_{i\omega 2} - \sigma_{i\omega 1})$ are unequal so that the quantity $[(\sigma_{i\omega 3} - \sigma_{i\omega 2}) - \sigma_{i\omega 2} - \sigma_{i\omega 1})]$ is a relatively large value, the apparent complex conductivity versus frequency curve has a changing slope and metallic sulphides are indicated.

Reference is now made to FIGURES 2a and 2b of the drawings wherein three of the six curves presented in each figure show typical values of the apparent complex conductivity ratio $$\left(\frac{\sigma_{i\omega}}{\sigma_{i 10}}\right)$$

and the apparent complex conductivity $\sigma_{i\omega}$, respectively, plotted against frequency variations on a log scale for three different types of subsurface mediums. Three of the six curves of FIGURE 2a show typical values of the phase angle, in radians, versus frequency variations for the same three different types of subsurface medium. The magnitude and increase (upward curvature) of phase angle with frequency are diagnostic of sulphides. FIGURE 2b plots the variation of out-of-phase conductance with frequency for the three cases selected. Again the magnitude and upward curvature are diagnostic of sulphides. It should be noted that the FIGURE 2a involves conductivity ratios as in application Serial No. 273,422 mentioned above; while FIGURE 2b involves conductivities.

The apparatus as described above and shown in FIGURE 1 of the drawings may be used to make apparent complex conductivity measurements for use in plotting the apparent complex conductivity function shown in the curves of FIGURE 2b. (Phase measurements for use in plotting the phase curves of FIGURE 2a, and out-of-phase conductance measurements such as plotted in FIGURE 2b, may be made with apparatus to be described later in the specification.)

The three different types of subsurface medium for which the stated variations have been plotted are:

(1) Quartzite; with about 65 metallic sulphides,
(2) Barren dolomite; and
(3) Limestone; with about 10% montmorillonite type clay and no metallic sulphide.

From an examination of the curves, it is evident that the apparent complex conductivity $\sigma_{i\omega}$, or ratio $$\frac{\sigma_{i\omega}}{\sigma_{i 10}}$$

of the quartzite, which contains about 6 percent metallic sulphides, has a relatively steep slope and a pronounced upward curvature. The barren dolomite results in an apparent complex conductivity curve having a low slope and one which is substantially uniform between the frequencies of 0.1 and 100 cycles per second. The limestone which contains 10 percent montmorillonite type clay and no metallic sulphides, exhibits a steep slope with little curvature. The curvature of the two apparent complex conductivity curves, then, distinguishes metallic sulphide deposits from montmorillonite types. The montmorillonite type clays, having high unsatisfied charges on the basal crystal lattice units gives rise to double charge (overvoltage) effects which are similar to those developed on sulphide surfaces but the different shapes of the apparent complex conductivity curves readily distinguishes the two. The barren dolomite is distinguished from both of these curves by the low slope and substantially straight line nature of the apparent complex conductivity versus frequency curve.

Figure 3:
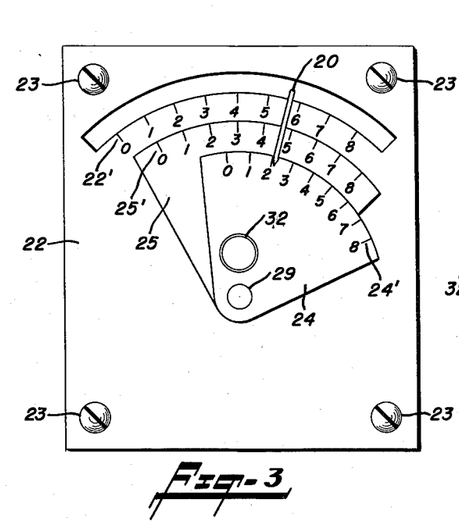
FIGURE 3 is a front view of a novel instrument scale device.
Figure 4:
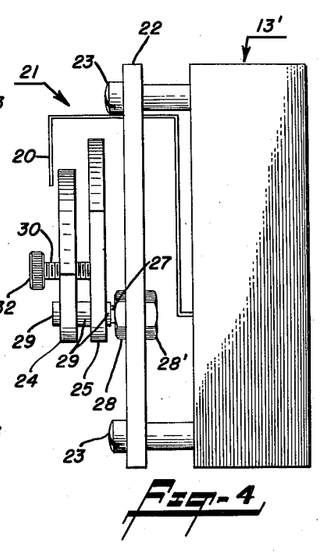
FIGURE 4 is a side view of the instrument scale device.

In order to aid in making rapid observations of the slope and curvature of the apparent complex conductivity versus frequency curve, we provide a novel instrument scale for use with the ammeter 13 in the apparatus of FIGURE 1. Referring to FIGURES 3 and 4 of the drawings, an ammeter 13' is shown diagrammetically. The actual details of construction of the meter mechanism are not important to an understanding of our novel instrument scale, and the ammeter has, therefore, been represented as a rectangular block. The ammeter is of the linearly responsive type so that uniformly spaced scale markings may be placed on the instrument scale to be described. A pointer 20 is adapted to deflect upon a passage of current through the ammeter in a manner well understood. The pointer 20 is properly shaped and bent so as to extend past the novel instrument scale designated generally by the reference numeral 21. The instrument scale comprises three separate scale plates; one fixed scale plate 22 which is suitably fastened to the ammeter 13' as by bolts 23, and two movable scale plates 24 and 25 which are both pivotally mounted on an extending rod 27 which is securely fastened to the fixed scale plate 22, as by fastening means 28, 28'. The rod 27 is positioned co-axially with the axis about which the pointer 20 rotates. The movable scale plate 24 and 25 frictionally engage the rod 27 so that they may be pivoted about the rod 27 at will by hand and yet remain at any position at which they are set. Axial movement of the scale plates 24 and 25 is prohibited by abutment members 29 suitably fastened to the rod 27. The movable scale plates 24 and 25 are provided with a locking device which may comprise a bolt 30 which is provided with a knurled head 32 and which threadedly engages the movable scale plate 24. By turning the bolt 30 so that the end of the bolt engages the center movable scale plate 25, the two movable scale plates 24 and 25 may be fixed relative to each other. All three scale plates are provided with similar, uniformly spaced, markings 22', 24' and 25' respectively.

The following operational example will illustrate the use of our novel instrument scale, and particularly as applied to an ammeter such as used in the apparent complex conductivity measuring apparatus of FIGURE 1. The three scales are provided with uniformly spaced scale markings in terms of apparent complex conductivity. (It will be understood however, that the novel instrument scale may be calibrated in any quantity to be measured providing uniformly spaced scale markings may be used on the three scale plates.) The first reading at frequency $f_1$ will result in an indication of the apparent complex conductivity $\sigma_{i\omega1}$ of the medium under test directly on the scale 22' of the fixed scale plate 22. The zero of the center scale 25' of the pivotal scale plate 25 is then set at the position of the pointer 20 for the frequency $f_1$. Next, the frequency of oscillation is changed and a second reading is taken at a frequency of $f_2$. The fixed scale 22' indicates the apparent complex conductivity $\sigma_{i\omega2}$ at a frequency of $f_2$. The center scale, however, now indicates directly the difference in the apparent complex conductivity $(\sigma_{i\omega2}-\sigma_{i\omega1})$. The zero position of the inner movable scale 24' may now be set at the position of the pointer 20 for the frequency $f_2$ and then locked relative to the center movable scale 25' by tightening the lock bolt 30 so that the movable scale plates 24 and 25 are relatively fixed to each other. The two movable scale plates are then pivoted so that the zero position of the center scale 25' is at the position of the pointer 20, for the second frequency $f_2$, which frequency results in a higher apparent complex conductivity reading $\sigma_{i\omega2}$ than at frequency $f_1$. The frequency of oscillation is then changed to a third frequency $f_3$ which results in a still higher apparent complex conductivity $\sigma_{i\omega3}$ than $\sigma_{i\omega1}$ or $\sigma_{i\omega2}$. The fixed scale 22' now indicates the apparent complex conductivity $\sigma_{i\omega3}$ at the frequency $f_3$. The center scale 25' indicates the difference between the apparent complex conductivity at $f_3$ and $f_2$; that is $\sigma_{i\omega3}-\sigma_{i\omega2}$; and the inner scale 24' now indicates directly the difference of the differences of apparent complex conductivity $[(\sigma_{i\omega3}-\sigma_{i\omega2})-(\sigma_{i\omega2}-\sigma_{i\omega1})]$. If the frequencies are chosen at equal logarithmic intervals, e.g. 0.1, 1 and 10 cycles per second, for example, then the center scale 25' will give an approximation of the slope of the curve while the inner scale 24 gives an approximation of the curvature of the plot of the apparent complex conductivity versus frequency on a logarithmic base. It is apparent that our novel scale device may be used with other apparatus for measuring other quantities which are diagnostic of the mineralization of an area as, for example, the phase angle between the charging current and pick-up voltage.

Figure 5:
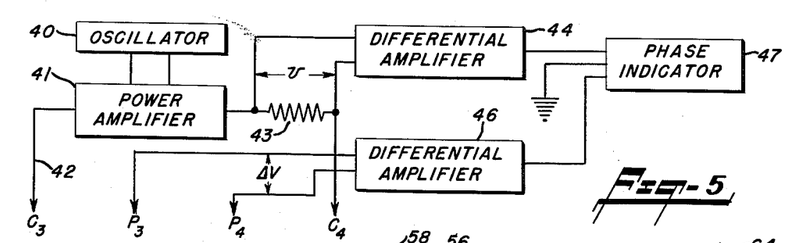
FIGURE 5 is a diagrammatic representation of an apparatus for use in making phase measurements between the charging current through a medium and the resultant voltage at a pair of pick-up electrodes.

Reference is now made to FIGURE 5 of the drawings wherein there is shown an apparatus and means for measuring the phase angle between the charging current and the pick-up voltage. An alternating current source comprises an oscillator 40 which is adjustable in frequency from 0.1 to 100 cycles per second. As in the case of the oscillator 13 of FIGURE 1, the oscillator 40 may be of the type wherein the oscillator may be set at one of three or more frequencies in the above mentioned range of frequencies; which frequencies may be chosen so as to be equally spaced logarithmically. It is not necessary that the oscillator magnitude be adjustable for use with the apparatus of FIGURE 5. The oscillator output is amplified by a conventional direct-coupled power amplifier 41, and the output from the power amplifier is fed directly to one electrode $C_3$ over the cable 42 and to the other charging electrode $C_4$ through a pure non-inductive resistor 43. The arrangement of the electrodes is unimportant in the operation of the apparatus of FIGURE 5 and merely determines the area in which the phase measurements are being taken. The phase angle between the charging current and pick-up voltage is not effected by the position of the spaced electrodes. The voltage which is developed across the pure, non-inductive resistor 43 is in-phase with the charging current $I_\omega$ and is designated as $v$. The voltage $\Delta V$, which is developed across the pick-up electrodes $P_2$ and $P_3$ is generally not in phase with $I_\omega$, but is out of phase by an angle of $\phi$. A conventional differential amplifier 44 is connected across the resistor 43 to provide amplification for the voltage $v$, while a second differential amplifier 46 is connected across the pick-up electrodes $P_3$ and $P_4$ to provide amplification to the voltage $\Delta V$. For proper operation of the apparatus, it is desirable that the output from each differential amplifier 44 and 46 be 1 volt, or greater. This is easily obtainable. The outputs from the differential amplifiers are connected to the input terminals of a conventional phase meter 47 where the phase angle difference between the two input voltages to the meter is directly indicated. The two input voltages to the phase meter 47 do not have to be of equal magnitude for the proper operation of the phase meter. The phase meter may be calibrated directly in degrees or radians and thereby indicate directly the phase difference between the voltages $v$ and $\Delta V$ which, in turn, is equal to the phase difference between $I_\omega$ and $\Delta V$. The indicated phase angle is a diagnostic factor in the determination of the presence of subsurface mineralization when low frequency charging currents are employed.

Reference is again made to FIGURE 2a of the drawings wherein the phase angle between the charging current and the voltage at the pick up electrodes versus $\log_{10}$ frequency for the quartzite with 6 percent metallic sulphides, the barren dolomite, and the limestone with about 10 percent montmorillonite type clay is shown. In general, the quartzite and the limestone both show a high phase angle while the dolomite, which is almost barren of mineralization, shows a low phase angle. It is seen, then, that the actual magnitude of the phase angle is diagnostic of mineralization in some instances. However, in the case of the quartzite, which contains about 6 percent metallic sulphides, and the limestone, which contains no metallic sulphides, the phase angle alone is not enough to distinguish between the two. Inspection of the limestone and quartzite curves however, reveals that the slopes of the curves are experimentally in opposite directions; that is, the phase angle of the quartzite increases relatively markedly with frequency while that of the limestone does not. The quartzite, which contains the metallic sulphides may be readily distinguished from the limestone, which contains the montmorillonite, by observing the slope of the phase angle versus frequency curves within the frequency range of 0.1 to 100 cycles per second. In practice, an approximation of the slope of the phase angle curve is obtained by changing the frequency of oscillation of the oscillator 40 (FIGURE 5) and noting the change in phase angle on the phase meter 47. If there is no change in phase angle with frequency, no metallic sulphide deposit is indicated; while if the phase angle increases with frequency, mineralization is indicated.

The above is paralleled for the case where the out-of-phase conductance is measured and plotted instead of the phase angle, as in FIGURE 2b. It can be shown that the phase angle is equal to;

$$\phi = \tan^{-1} \frac{\omega \epsilon_\omega}{\sigma_\omega}$$

and since $\phi$ is small $$\phi = \frac{\omega \epsilon_\omega}{\sigma_\omega} = \text{phase angle}$$

and $\phi \sigma_\omega = \omega \epsilon_\omega =$ out-of-phase conductance wherein $\epsilon_\omega$ is the apparent dielectric constant of the medium, and $\sigma_\omega$ is the real component of the apparent complex conductivity Thus, we see that the aparent complex conductivity, as measured by apparatus of FIGURE 1, for example, is related to the phase angle $\phi$ of the voltage drop across any ground section relative to the primary current, as measured by the apparatus of FIGURE 5, for example. The phase angle is small, in the order of $10^{-2}$ radians, so that for practical purposes, it is possible to use the value of the apparent complex conductivity $\sigma_{i\omega}$ in place of the real component $\sigma_\omega$ thereof in the above formula. It is seen that the apparent dielectric constant $\epsilon_\omega$ is directly related to the out of phase conductance $\omega \epsilon_\omega$ of the subsurface medium. Both $\phi$ and $\omega \epsilon_\omega$ are diagnostic quantities for sulphides.

Figure 6:
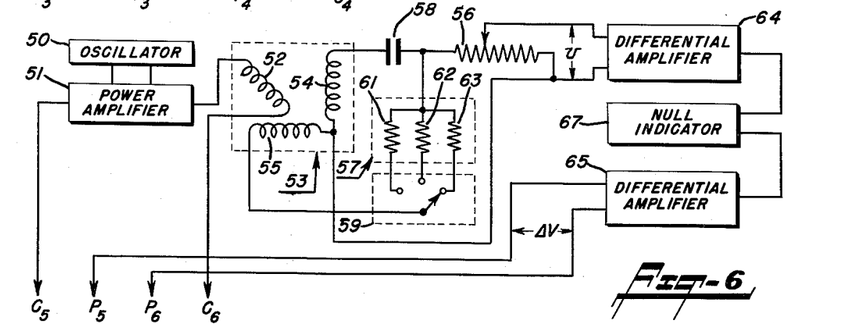
FIGURE 6 is a diagrammatic representation of an apparatus for use in making both phase measurements between the charging current through a medium and the resultant voltage at a pair of pick-up electrodes, and apparent complex conductivity measurements of the medium at the same time.

A method of directly measuring both the apparent complex conductivity $\sigma_{i\omega}$ of a subsurface medium, and the phase angle $\phi$ of the voltage drop across any ground section relative to the primary charging current, with only one piece of apparatus, will now be described. The apparatus for making both measurements simultaneously is shown in FIGURE 6 of the drawings. Referring to FIGURE 6, an oscillator 50 provides a source of alternating current and is adjustable in frequency between 0.1 and 100 cycles per second. The oscillator may be of the type wherein the frequency of oscillation is adjustable to three or more desired frequencies $$\left(\frac{\omega}{2\pi}\right)$$

which frequencies are preferably equally logarithmically spaced. The output of the oscillator 50 is fed to a conventional power amplifier 51 where the oscillator output is amplified. The current from the power amplifier is fed directly to one charging electrode $C_5$ and to a second charging electrode $C_6$ through the rotor coil 52 of a two phase syncro 53. When a charging current $I_\omega$ flows through the electrodes $C_5$ and $C_6$ and the ground, a voltage $\Delta V$ is developed across the two pickup electrodes $P_5$ and $P_6$. As in the apparatus of FIGURES 1 and 5, the electrode configuration is not important as the geometrical factor may be calculated for any electrode array and the apparatus be calibrated accordingly. $\Delta V$, the voltage developed at the pick-up electrodes $P_5$, $P_6$ is generally out of phase with the charging current $I_\omega$ by an angle of $\phi$ when metallic sulphides are present in the ground.

The two phase syncro 53 has two stator coils 54 and 55 which are at right angles to each other. The voltages which are developed in the stator coils by the rotor coil 52, which may be set at any angle $\theta$ with respect to the stator coil 54, will both be 90 degrees out of phase with the charging current $I_\omega$ and will have the following magnitudes:

Voltage in stator $54 = \omega M I_\omega \cos \theta$

Voltage in stator $55 = \omega M I_\omega \sin \theta$ wherein:

M is the mutual coupling of the rotor and stator coils.

The stator coils 54 and 55 have one terminal in common, which is connected to one fixed terminal of a potentiometer 56. The other terminals of the stators 54 and 55 are connected across a phase shifting RC circuit comprising a resistance network 57 and a capacitor 58. A switch 59 is provided in the resistance branch of the RC circuit so that any one of the resistors 61, 62 and 63 may be connected in the circuit. The common terminal of the capacitor 58 and resistance network 57 is connected to the other fixed terminal of the potentiometer 56.

The resistance of the potentiometer 56 is selected to be very much greater than the resistance of any of the resistors 61, 62 or 63 in the resistance network 57. The resistance R of the resistance network 57 and the capacitance C of the capacitor 58 are chosen so that $\omega CR = 1$. The switch 59 provides means whereby the condition $\omega CR = 1$ may be fulfilled at three separate frequencies by switching into the circuit a suitably valued resistor 61, 62 or 63. If the oscillator is adjustable to more than 3 different frequencies within the frequency range of 0.1 to 100 cycles per second it will be understood that an additional resistor having the proper value must be inserted into the RC circuit for each additional frequency of oscillation.

The phase shifting circuit reduces the voltage by a factor of $1/\sqrt{2}$ and introduces a phase shift of +45 degrees to the voltage across the stator coil 54 and a phase shift of −45 degrees to the voltage across the stator coil 55. Hence, the voltage appearing across the potentiometer 56 is made up of the two voltages:

(1) One voltage due to stator coil $54 = \dfrac{\omega M I_\omega \cos \phi}{\sqrt{2}}$ with a phase angle of +135 degrees with respect to $I_\omega$, and (2) A second voltage due to the stator coil $55 = \dfrac{\omega M I_\omega \sin \phi}{\sqrt{2}}$ with a phase angle of +45 degrees with respect to $I_\omega$.

The total voltage at the potentiometer $56 = \dfrac{\omega M I_\omega}{\sqrt{2}}$ with a phase angle of $135 - \theta$ with respect to $I_\omega$.

The potentiometer 56 is used to fractionate this voltage to a level of $$v' = \frac{\alpha \omega M I_\omega}{\sqrt{2}}$$

(where $\alpha$ is variable) without further changing the phase angle thereof. The voltage $v'$ is compared with $\Delta V$, the voltage across the pick-up electrodes, by the use of differential amplifiers 64 and 65 and a null indicating device 67. The output of the potentiometer 56 is connected to the one differential amplifier 64 while the pick-up electrodes $P_5$ and $P_6$ are connected to a second identical differential amplifier 65. The terminal connections of the differential amplifiers 64 and 65 are selected so that the differential amplifier outputs from each amplifier are in antiphase, or bucking relation. The output from the differential amplifiers is then connected to a null indicator device 67, such as a vacuum tube volt meter, or oscilloscope or, at higher audible frequencies, a pair of headphones, or any other suitable null indicating device. A null indication is obtained when $\Delta V$ and $v'$ are both equal i.e. when:

$$\Delta V = \frac{\alpha \omega M I_\omega}{\sqrt{2}}$$

and the phase angle $\phi = 135 - \theta$.

The potentiometer 56 may thus be calibrated directly in admittance $$\gamma_\omega = \frac{I_\omega}{\Delta V}$$

mhos or, if the geometrical constant K for a given electrode arrangement and spacing has been calculated, the potentiometer may be calibrated directly in apparent complex conductivity $$\sigma_{i\omega} = \frac{\gamma_\omega}{K}$$

mhos per meter. The two phase syncro may be calibrated directly in phase angle $\phi$ which, as stated above, equals $135° - \theta$, or it may be calibrated in radians. $\phi \sigma_{i\omega}$ gives the out-of-phase conductance directly.

Figure 7:
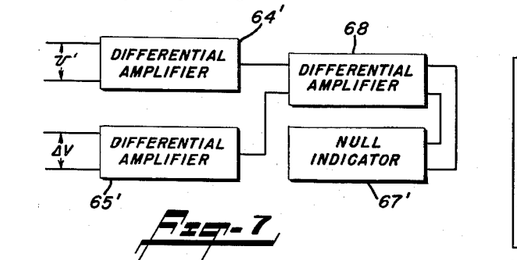
FIGURE 7 is a diagrammatic presentation of a differential amplifier and null indicator circuitry which may be used in place of the null indicator and differential amplifiers of FIGURE 6.

If the circuit connections have been made so that the outputs from the differential amplifiers 64 and 65 are in phase (when $v'$ and $\Delta V$ are exactly in phase) then the outputs from the two differential amplifiers are connected to a third differential amplifier before being connected to a null indicating device. FIGURE 7 shows the addition of a third differential amplifier to the circuit of FIGURE 6. The circuitry to the differential amplifiers 64' and 65' is the same as the circuitry to the differential amplifiers 64 and 65 of FIGURE 6, therefore has not been shown in FIGURE 7 of the drawings. A third differential amplifier 68 is connected between the differential amplifiers 64' and 65' and the null indicator 67'. The operation of a differential amplifier is such that an output is obtained therefrom only when a difference of potential exists between the input terminals. If the two inputs to the differential amplifier 68 are equal and in phase, there will be no output therefrom. Therefore, if $v'$ and $\Delta V$ are equal and in phase, the balance is indicated by a null at the null indicating device 67'.

The operational procedure for the use of the apparatus of FIGURES 5 and 6 is to first set the switch 59 to the position such that the proper resistor for the frequency being utilized at the time, is connected into the circuit. Then the two phase syncro rotor coil 52 and the potentiometer 56 are adjusted until a null indication is obtained at the null indicating device. The phase angle and admittance, or apparent complex conductivity, may then be read off a properly calibrated syncro dial and a properly calibrated potentiometer scale, respectively.

Figure 8:
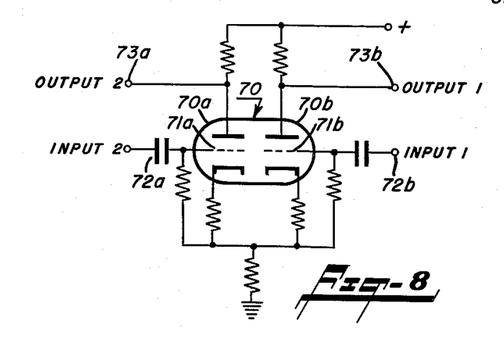
FIGURE 8 is a circuit diagram of a differential amplifier which may be used for any of the differential amplifiers shown in FIGURES 5, 6 and 7.

Reference is now made to FIGURE 8 of the drawings wherein there is shown a schematic circuit diagram of a differential amplifier such as may be used in any of the circuits shown in FIGURES 5, 6 and 7. The differential amplifier is of a conventional design and a complete description of the operation thereof is deemed unnecessary. The differential amplifier circuit may include a double triode tube 70 having two triode sections 70a and 70b, which are matched for equality of amplification factor, and associated circuitry. In-put signals may be applied to either, or both, of the triode section grids 71a and 71b through capacitors 72a and 72b, respectively. Outputs may be taken from either, or both, output terminals 73a and 73b.

It will be understood by those skilled in this art that the output of the differential amplifier depends only upon the difference between the in-put signals applied to the in-put terminals and not on the absolute level of these in-puts. The phase of the output signals at the output terminal 73a is opposite the phase of the output signal at the output terminal 73b and so the output may be taken off either terminal according to the phase desired. In the case of the third differential amplifier 68 shown in FIGURE 7, the output is taken from both output terminals.

Figure 9:
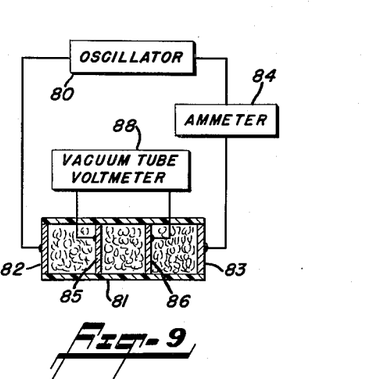
FIGURE 9 is similar to the diagrammatic representation of FIGURE 1 applied to a laboratory set up.

Each of the apparatus which has been described is designed for field use. It will be understood that laboratory tests of rock samples may be made with the same or similar apparatus. Reference is now made to FIGURE 9 wherein there is illustrated a laboratory apparatus for measuring the apparent complex conductivity of an ore sample, which apparatus is similar to that shown in FIGURE 1 of the drawings. An oscillator 80 provides a source of alternating current which is adjustable between the frequencies of 0.1 and 100 cycles per second and capable of delivering a maximum current of several amperes. The magnitude of the oscillator output is also adjustable. For laboratory use, a power amplifier, generally, is not required as an oscillator which delivers adequate current is easily designed. Particles of the medium under test are enclosed in a cylinder 81, made of a suitable insulating material, and provided with metallic end plates 82, 83 closing each end thereof. A 0.01 percent normal solution of NaCl comprises approximately 5 percent of the total contained volume of the cylinder. One side of the oscillator is connected directly to the metal plate 82 and the other side is connected to the metal plate 83 through an ammeter 84. Two conducting rings 85, 86 made of thin copper are centrally spaced between the end plates 82 and 83 and have axes which coincide with that of the cylinder 81. A vacuum tube voltmeter 88 is connected to the two conducting rings 85, 86. The ammeter may be calibrated directly in terms of apparent complex conductivity.

The procedure for measuring the apparent complex conductivity of the particles in the cylinder is the same as that used with the field apparatus of FIGURE 1. At one frequency $f_1$ of oscillation, the magnitude of the oscillator output is adjusted until the voltmeter 88 reads a predetermined value, which value depends upon the geometry of the end plates 82, 83 and the conducting rings 85, 86 as well as the spacing thereof. The apparent complex conductivity is read directly on the ammeter 84 if the ammeter is so calibrated. The voltmeter is then set for the same reading at another frequency $f_2$ by adjustment of the oscillator output. The ammeter then indicates the apparent complex conductivity at the second frequency $f_2$. Similar readings at three or more frequencies may be made.

The instrument scale device as illustrated in FIGURES 3 and 4 may obviously be used with the apparatus of FIGURE 9 in order to obtain an approximation of the slope of the apparent complex conductivity curve versus frequency, as well as the curvature thereof; which factors are diagnostic of the presence of mineralization.

It will be understood that the other apparatus which has been described and which is shown in FIGURES 5, 6 and 7 may be used for making laboratory tests of ore samples by replacing the charging and pick-up stakes which are inserted into the ground, with a chamber filled with the ore particles such as is used in the apparatus of FIGURE 9. In addition, power amplifiers are unnecessary for laboratory apparatus if an oscillator having a sufficient output is used.

Having now described our invention in detail, certain changes and modifications in the apparatus and/or the method of exploration will occur to those skilled in this art and it will be understood that such changes and modifications may be made without departing from the spirit and scope of our invention as set forth in the following claims.

We claim:
1. Apparatus for use in geophysical exploration comprising a source of sinusoidal current, a two phase syncro, a pair of spaced charging electrodes inserted into the ground and connected to the said source of sinusoidal current through the rotor of the said two phase syncro, a series connected phase shifting capacitor and resistor connected across the series connected stators of the said syncro, a potentiometer connected across the junction between the said syncro stators and the junction between the said phase shifting capacitor and resistor, a first differential amplifier having an input from the said potentiometer, a pair of spaced pick-up electrodes inserted into the ground within the influence of the current flowing through the said ground, a second differential amplifier having an input from the said spaced pick-up electrodes, and an electrical indicator connected to the output circuits of the said differential amplifiers.

2. The invention as recited in claim 1 including switching means whereby any one of a plurality of resistors may be selectively substituted for the said phase shifting resistor.

3. The invention as recited in claim 1 wherein the said two-phase syncro and potentiometer are calibrated directly in phase angle and apparent complex conductivity, respectively, the said potentiometer being calibrated at each frequency used.

4. The invention as recited in claim 1 wherein the frequency of oscillation of the said source of sinusoidal current may be varied.

5. The invention as recited in claim 1 wherein the said electrical indicator comprises a null indicating device.

6. Apparatus for use in geophysical exploration comprising a source of sinusoidal current, a two phase syncro, a pair of spaced charging electrodes inserted into the ground and connected to the said source of sinusoidal current through the syncro rotor, a series connected phase shifting capacitor and resistor connected across the series connected syncro stators, a potentiometer connected across the junction between the said syncro stators and the junction between the said phase shifting resistor and capacitor, a first differential amplifier having an input from the said potentiometer, a pair of spaced pick-up electrodes inserted into the ground within the influence of the current flowing through the ground, a second differential amplifier having an input from the said spaced pick-up electrodes, a third differential amplifier connected to the output circuits of the said first and second differential amplifier, and an electrical indicator connected to the output circuits of the said third differential amplifier.

7. The invention as recited in claim 6 including switching means whereby any one of a plurality of resistors may be selectively substituted for the said phase shifting resistor.

8. The invention as recited in claim 6 wherein the said two-phase syncro and potentiometer are calibrated directly in phase angle and apparent complex conductivity, respectively, the said potentiometer being calibrated for each frequency used.

9. The invention was recited in claim 6 wherein the frequency of oscillation of the said source of sinusoidal current is variable.

10. The invention as recited in claim 6 wherein the said electrical indicator comprises a null indicating device.

11. Apparatus for use in geophysical exploration and comprising a source of sinusoidal current; means varying the frequency of the said source in discrete steps; means varying the magnitude of the said source; a pair of spaced charging electrodes inserted into the ground and connected to the said source through a current indicating device; the said current indicating device being provided with an instrument scale device comprising a fixed scale and first and second movable scale plates, each of the said fixed and movable scale plates being provided with similar scales having uniformly spaced markings, a movable pointer extending from the said current indicating device and adapted to pivot about an indicator axis, a rod mounted on the said fixed scale plate and having an axis extending along the said indicator axis extended, the said movable scale plates being pivotally mounted on the said rod, means manually locking the said first and second movable scale plates together; a pair of spaced pick-up electrodes inserted into the ground within the field of influence of the current flowing through the said charging electrodes; and an electrical voltage indicating device connected to the said pick-up electrodes.

References Cited in the file of this patent

UNITED STATES PATENTS

| | | |
|---|---|---|
| 2,104,440 | Statham et al. | Jan. 4, 1938 |
| 2,156,259 | Blau | May 2, 1939 |
| 2,169,685 | Evjen | Aug. 15, 1939 |
| 2,190,320 | Potapenko | Feb. 13, 1940 |
| 2,230,803 | Klipsch et al. | Feb. 4, 1941 |
| 2,293,024 | Klipsch | Aug. 11, 1942 |
| 2,294,395 | Evjen | Sept. 1, 1942 |
| 2,375,778 | Evjen | May 15, 1945 |
| 2,549,655 | Woodward | Apr. 17, 1951 |
| 2,584,958 | Williams | Feb. 5, 1952 |
| 2,611,004 | Brant et al. | Sept. 16, 1952 |
| 2,613,247 | Lee | Oct. 7, 1952 |
| 2,690,537 | Weiss | Sept. 28, 1954 |
| 2,766,421 | Wait et al. | Oct. 9, 1956 |
| 2,777,111 | Hunter | Jan. 8, 1957 |